US012698039B2

(12) United States Patent (10) Patent No.: US 12,698,039 B2
Zaremba et al. (45) Date of Patent: Aug. 4, 2026

(54) RECONFIGURABLE VEHICLE

(71) Applicant: Textron Inc., Providence, RI (US)

(72) Inventors: Matthew James Zaremba, Evans, GA (US); Robert Brady, Sarasota, FL (US); Erik Holmen, Lakewood Rance, FL (US); Scott Wohlgamuth, Martinez, GA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 396 days.

(21) Appl. No.: 18/406,427

(22) Filed: Jan. 8, 2024

(65) Prior Publication Data

US 2024/0246613 A1 Jul. 25, 2024

Related U.S. Application Data

(60) Provisional application No. 63/440,623, filed on Jan. 23, 2023.

(51) Int. Cl.
| | |
|---|---|
| B62D 25/08 | (2006.01) |
| B60Q 1/04 | (2006.01) |
| B60R 19/18 | (2006.01) |
| B62D 21/18 | (2006.01) |

(52) U.S. Cl.
CPC .......... B62D 25/085 (2013.01); B60Q 1/0483 (2013.01); B60R 2019/1886 (2013.01); B62D 21/183 (2013.01)

(58) Field of Classification Search
CPC .... B62D 21/183; B62D 25/08; B62D 25/081;
B62D 25/085; B62D 25/10; B62D 25/105; B62D 25/14; B62D 25/145; B62D 65/16; B60R 19/44; B60R 19/48; B60R 19/52; B60R 2019/1886; B60Q 1/0408; B60Q 1/0483; B60Q 1/0491; B60Q 1/0458; Y10S 280/05; B60Y 2200/20; B60Y 2200/23; B60Y 2200/124
See application file for complete search history.

(56) References Cited

U.S. PATENT DOCUMENTS

| | | | | |
|---|---|---|---|---|
| 9,440,527 B1 * | 9/2016 | Maeda | ................... | B60K 11/04 |
| 2005/0036331 A1 * | 2/2005 | Crepeau | ............... | B60Q 1/0683 |
| | | | | 362/516 |
| 2006/0108836 A1 * | 5/2006 | Fayt | ....................... | B62D 65/16 |
| | | | | 296/193.09 |
| 2006/0180383 A1 * | 8/2006 | Bataille | ................ | B62D 21/183 |
| | | | | 180/311 |
| 2007/0216180 A1 * | 9/2007 | Hanson | ................ | B60Q 1/0035 |
| | | | | 296/1.08 |
| 2007/0267237 A1 * | 11/2007 | Hanson | ................ | B62D 25/163 |
| | | | | 180/89.1 |

(Continued)

*Primary Examiner* — Gregory A Blankenship
(74) *Attorney, Agent, or Firm* — Sandberg Phoenix & von Gontard, P.C.

(57) ABSTRACT

A front body assembly for a vehicle, wherein the front body assembly comprises a bumper and wheel-well assembly, a cowl connectable to the front bumper and wheel-well assembly, and a utility bay disposed in one of the front bumper and wheel-well assembly and the front cowl. The utility bay comprises one or more headlight pocket and mounting and support structure that is structured and operable to interchangeably secure a fascia panel and a headlight assembly within the utility bay.

20 Claims, 17 Drawing Sheets

(56)        References Cited

U.S. PATENT DOCUMENTS

| | | | |
|---|---|---|---|
| 2008/0023240 A1* | 1/2008 | Sunsdahl | B60K 17/35 |
| | | | 180/312 |
| 2009/0008818 A1* | 1/2009 | Fayt | B62D 65/16 |
| | | | 264/239 |
| 2011/0094816 A1* | 4/2011 | Suzuki | B62D 29/046 |
| | | | 180/291 |
| 2011/0094819 A1* | 4/2011 | Suzuki | B62D 25/00 |
| | | | 296/210 |
| 2011/0204680 A1* | 8/2011 | Fortin | B62D 25/085 |
| | | | 296/193.1 |
| 2013/0267377 A1* | 10/2013 | Jenkins, Jr. | B60K 6/52 |
| | | | 180/65.265 |
| 2016/0167715 A1* | 6/2016 | Kosuge | B62D 25/10 |
| | | | 296/181.1 |
| 2017/0232905 A1* | 8/2017 | Jhant | B60R 9/06 |
| | | | 296/192 |
| 2017/0327156 A1* | 11/2017 | Tsumiyama | B60R 19/52 |
| 2018/0178677 A1* | 6/2018 | Swain | B60N 2/01 |
| 2019/0071000 A1* | 3/2019 | Conley | B60Q 1/2638 |
| 2019/0211915 A1* | 7/2019 | Davis | F16H 61/662 |
| 2019/0270416 A1* | 9/2019 | Glickman | B62D 25/085 |
| 2020/0094729 A1* | 3/2020 | Tanabe | B62D 27/023 |
| 2021/0023936 A1* | 1/2021 | Marietta | B60K 13/02 |
| 2022/0315115 A1* | 10/2022 | Lyons | B62D 21/183 |
| 2023/0249623 A1* | 8/2023 | Poirier | B60G 5/00 |
| | | | 180/41 |
| 2023/0322076 A1* | 10/2023 | Frank | B60R 22/48 |
| | | | 180/273 |
| 2024/0246613 A1* | 7/2024 | Zaremba | B62D 25/085 |
| 2025/0229840 A1* | 7/2025 | Hidaka | B60Q 1/04 |

* cited by examiner

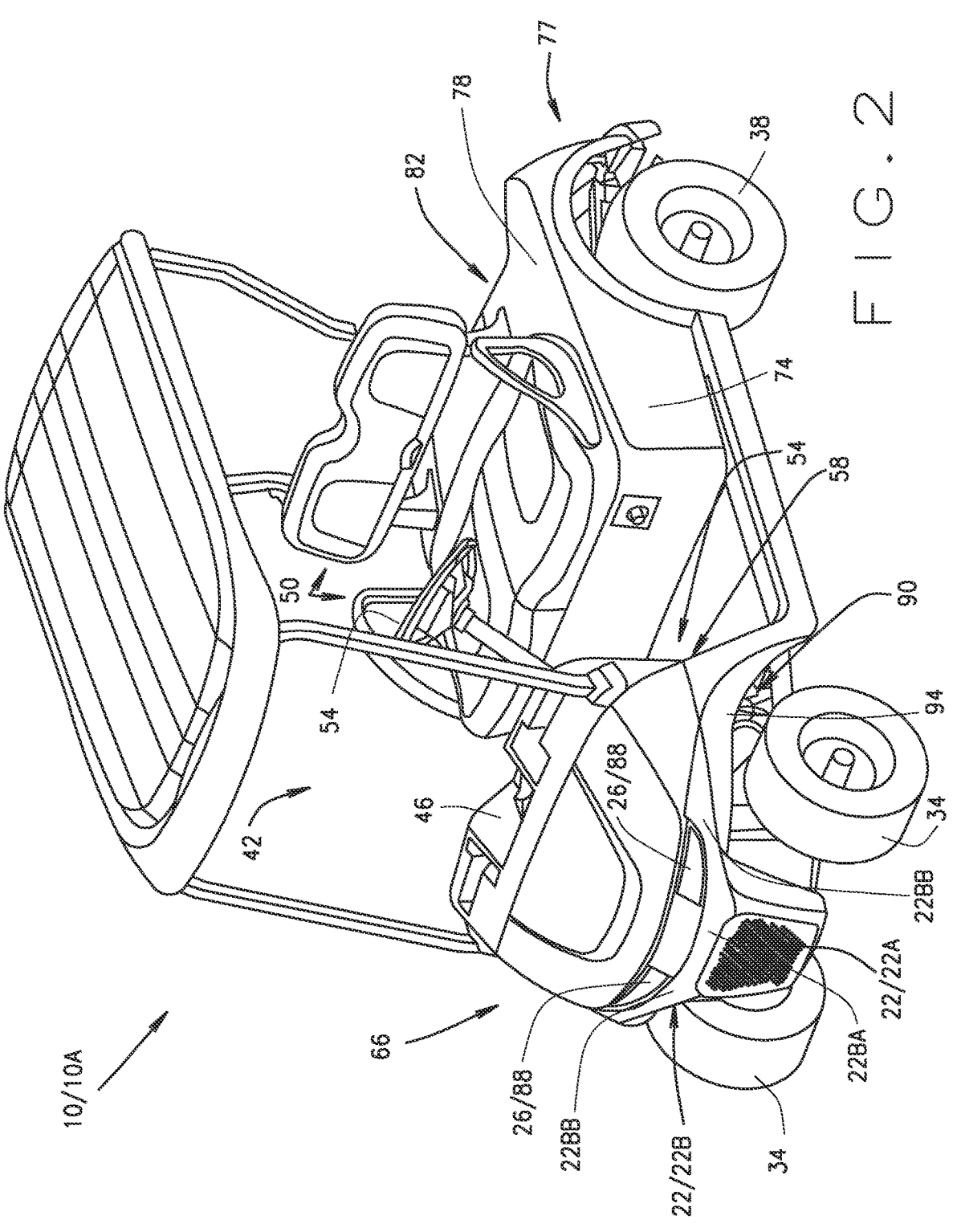
F I G . 2

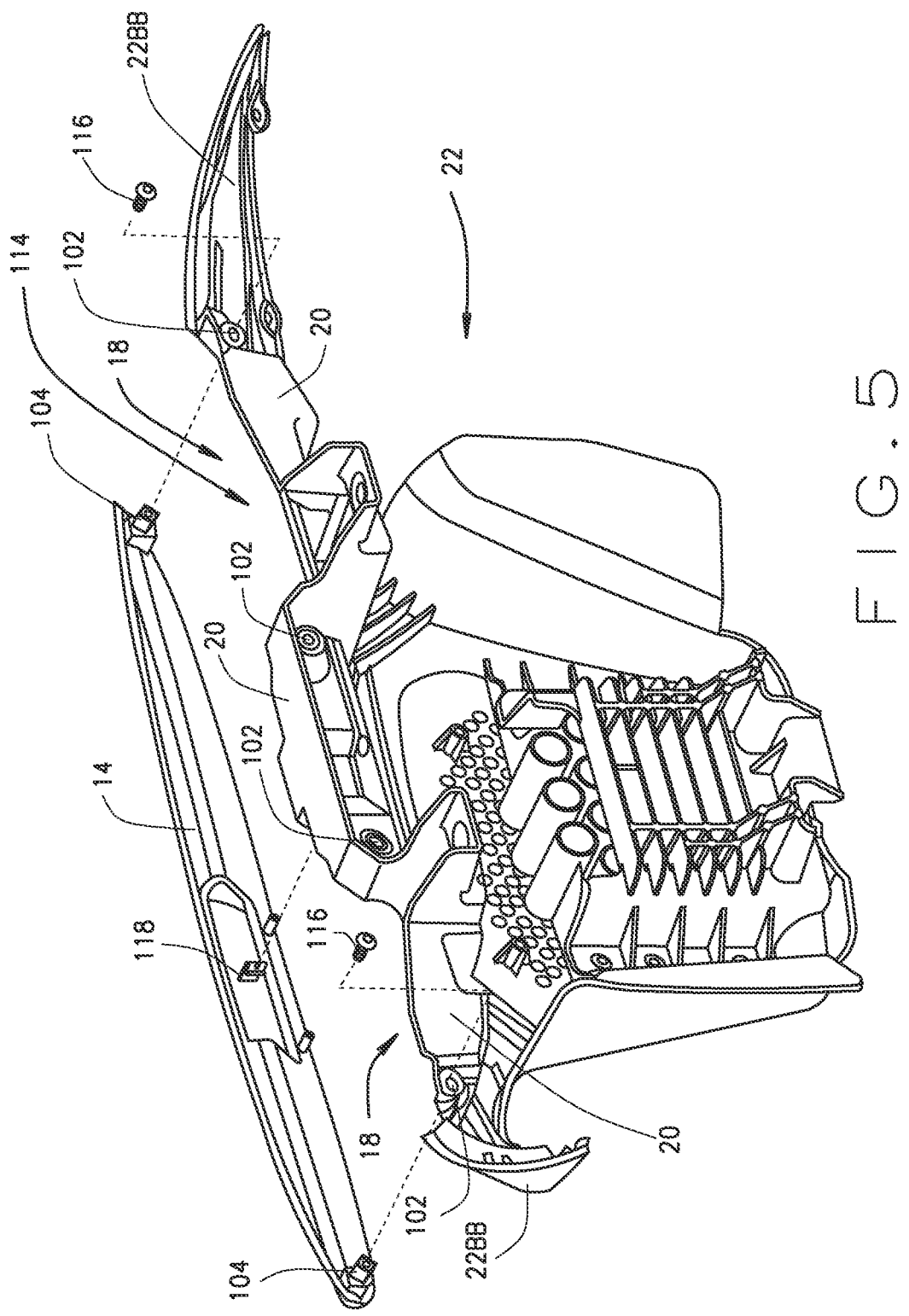
F I G . 5

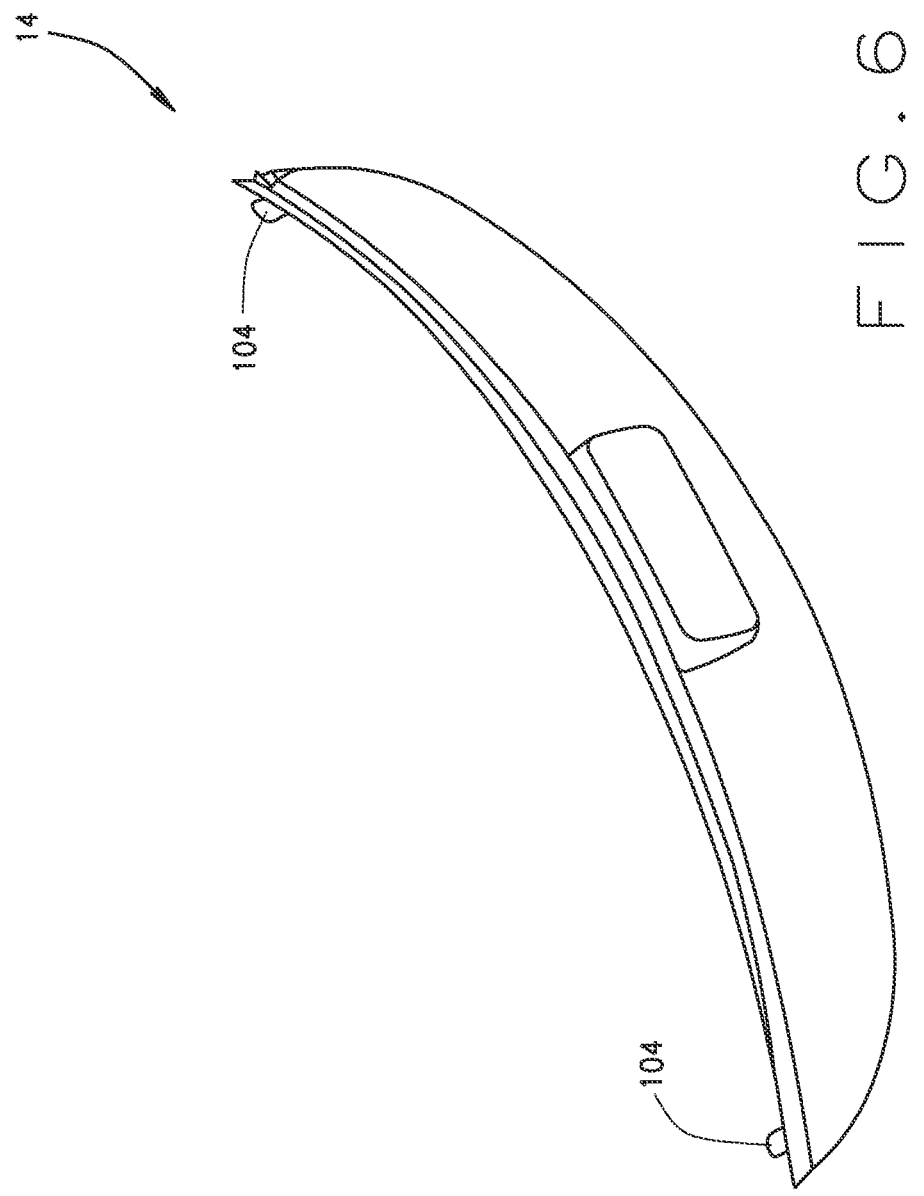
F I G . 6

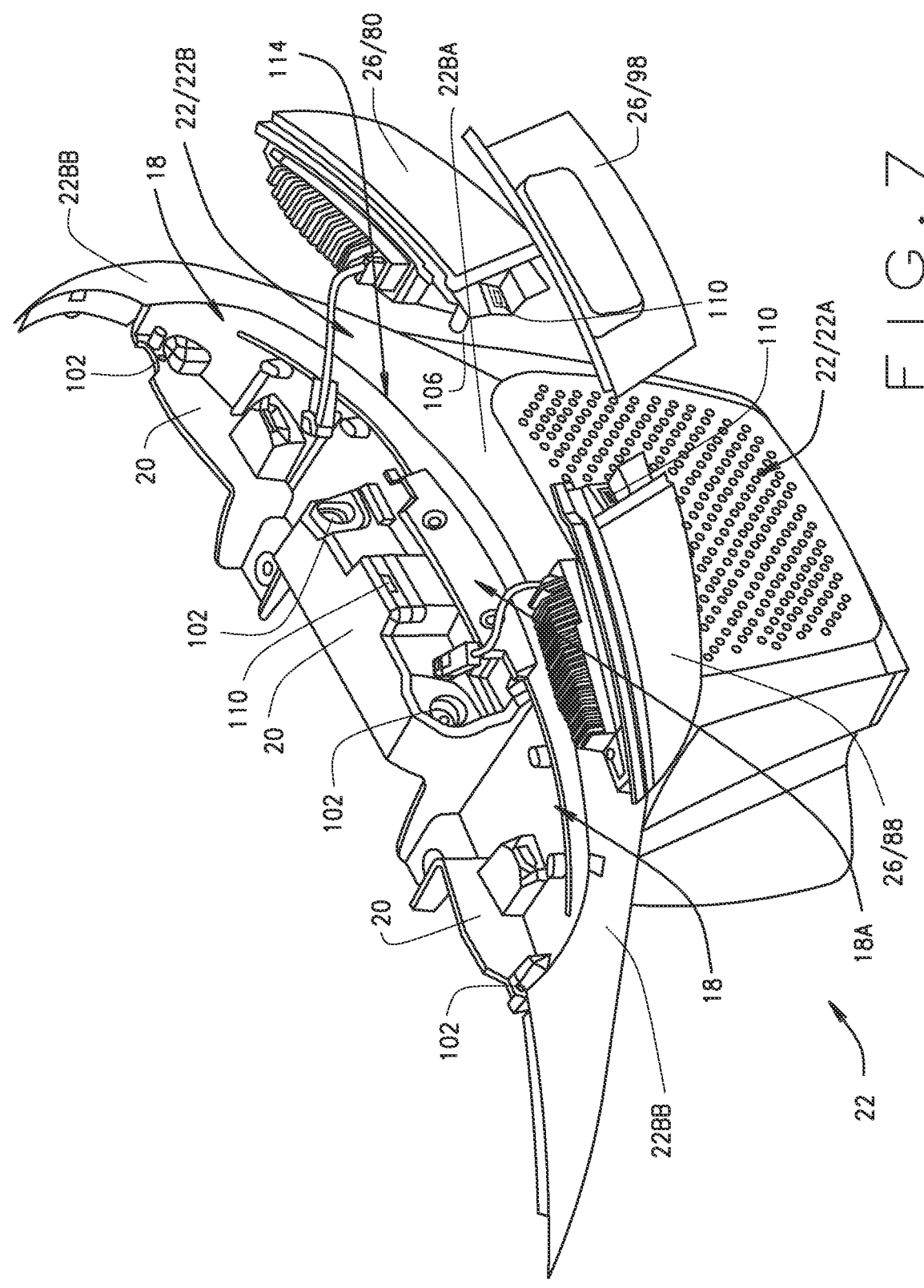
F I G . 7

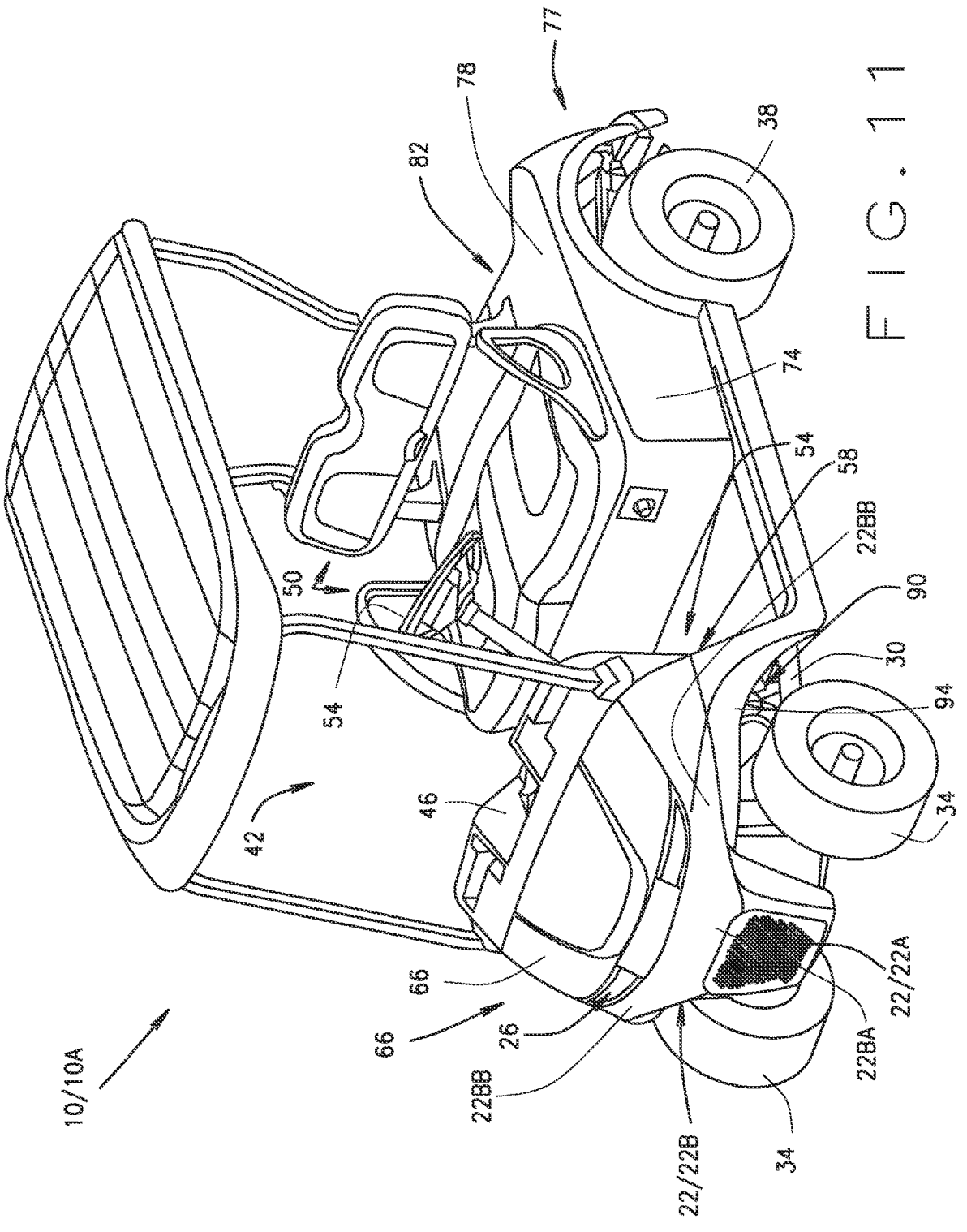
F I G . 1 1

RECONFIGURABLE VEHICLE

CROSS-REFERENCE TO RELATED APPLICATIONS

This application claims the benefit of U.S. Provisional Application No. 63/440,623, filed on Jan. 23, 2023. The disclosure of the above application is incorporated herein by reference in its entirety.

FIELD

The present teachings relate to lightweight vehicles, such as golf cars, and more particularly to a vehicle manufactured as a golf car without head lights but comprising concealed headlight mounting structure for converting or reconfiguring the vehicle to a personal consumer vehicle with headlights without physically altering any vehicle body or structure and without adding after-market headlight mounting structure.

BACKGROUND

The statements in this section merely provide background information related to the present disclosure and may not constitute prior art.

Golf cars are often built for use on a golf course where headlights (and/or taillights) are not needed or required. Hence, most golf cars are designed and assembled without headlights. However, often after use as a golf cars, such golf cars are converted for use as private consumer vehicles, e.g., private community personal vehicles or other types of transport vehicle where headlights (and/or taillights) are needed or required, therefore when converted to private consumer vehicles it is often desirable to add headlights (and/or taillights) to the vehicles. Typically, the conversion process to add headlights (and/or taillights) involves physical alteration of various parts of the golf car, such as cutting and/or drilling holes in the body of the vehicle in which the headlights (and/or taillights) are to be installed and adding additional mounting structure and/or brackets (i.e., structure and/or brackets that are not included as part of the golf car) to the body and/or frame of the vehicle to which the headlights can be mounted and secured.

SUMMARY

I various embodiments, the present disclosure provides a front body assembly for a vehicle, wherein the front body assembly comprises a bumper and wheel-well assembly, a cowl connectable to the front bumper and wheel-well assembly, and a utility bay disposed in one of the front bumper and wheel-well assembly and the front cowl. The utility bay comprises one or more headlight pocket and mounting and support structure that is structured and operable to interchangeably secure a fascia panel and a headlight assembly within the utility bay.

In various other embodiments, the present disclosure provides a vehicle comprising a chassis and a front body assembly. In various embodiments, the front body assembly comprises a bumper and wheel-well assembly, a cowl connectable to the front bumper and wheel-well assembly, and a utility bay disposed in one of the front bumper and wheel-well assembly and the front cowl. The utility bay comprises one or more headlight pocket and mounting and support structure that is structured and operable to interchangeably secure a fascia panel and a headlight assembly within the utility bay.

In yet other embodiments, the present disclosure provides a front body assembly reconfiguration system for reconfiguring a golf car to a personal consumer vehicle, wherein the system comprises a fascia panel, a headlight assembly comprising one or more headlight, and a front body assembly. In various embodiments, the front body assembly comprises a bumper and wheel-well assembly, a cowl connectable to the front bumper and wheel-well assembly, and a utility bay disposed in one of the front bumper and wheel-well assembly and the front cowl. In various implementations, the utility bay comprises one or more headlight pocket, and mounting and support structure that is structured and operable to interchangeably secure a fascia panel and a headlight assembly within the utility bay, wherein the utility bay is structured and operable to interchangeably receive the fascia panel and the headlight assembly.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

BRIEF DESCRIPTION OF DRAWINGS

The drawings described herein are for illustration purposes only and are not intended to limit the scope of the present teachings in any way.

FIG. 2 is an isometric view of the vehicle shown in FIG. 1 configured as a personal consumer vehicle in accordance with various embodiments of the present disclosure.

FIG. 5 is an exploded rear isometric view of the bumper and wheel-well assembly shown in FIG. 4 in accordance with various embodiments of the present disclosure.

FIG. 6 is a front isometric view of the removeable non-headlight body fascia panel in accordance with various embodiments of the present disclosure.

FIG. 7 is an exploded front isometric view of the bumper and wheel-well assembly comprising the utility bay configured with a headlight assembly to configure the vehicle as the personal consumer vehicle shown in FIG. 2 in accordance with various embodiments of the present disclosure.

FIG. 11 is an isometric view of the vehicle shown in FIG. 10 configured as a personal consumer vehicle in accordance with various embodiments of the present disclosure.

Corresponding reference numerals indicate corresponding parts throughout the several views of drawings.

DETAILED DESCRIPTION

Figure 1:
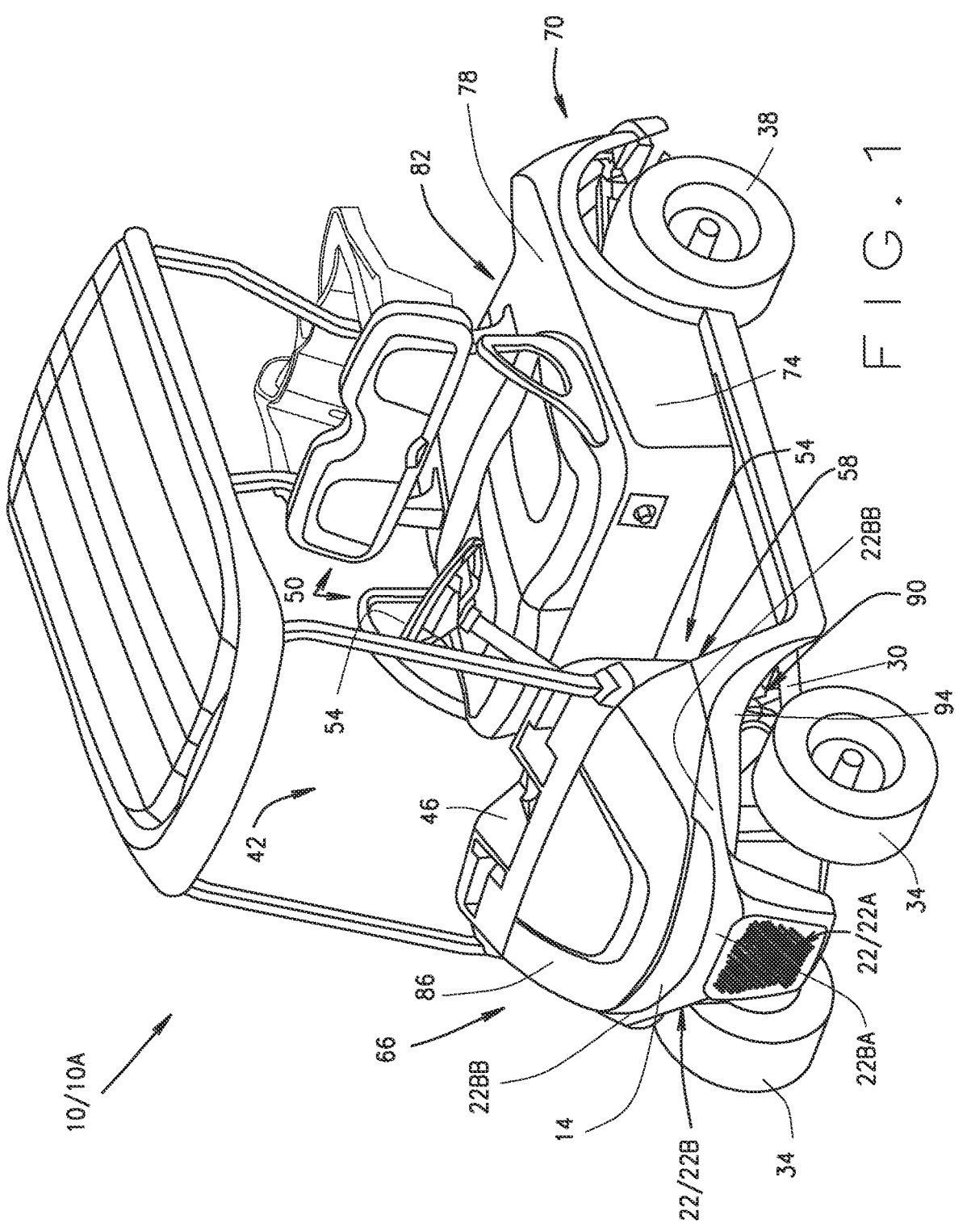
FIG. 1 is an isometric view of a vehicle of the present disclosure comprising a front body assembly that comprises a utility bay including at least one headlight pocket and mounting structure, wherein the vehicle is configured as a golf car in accordance with various embodiments of the present disclosure.
Figure 3:
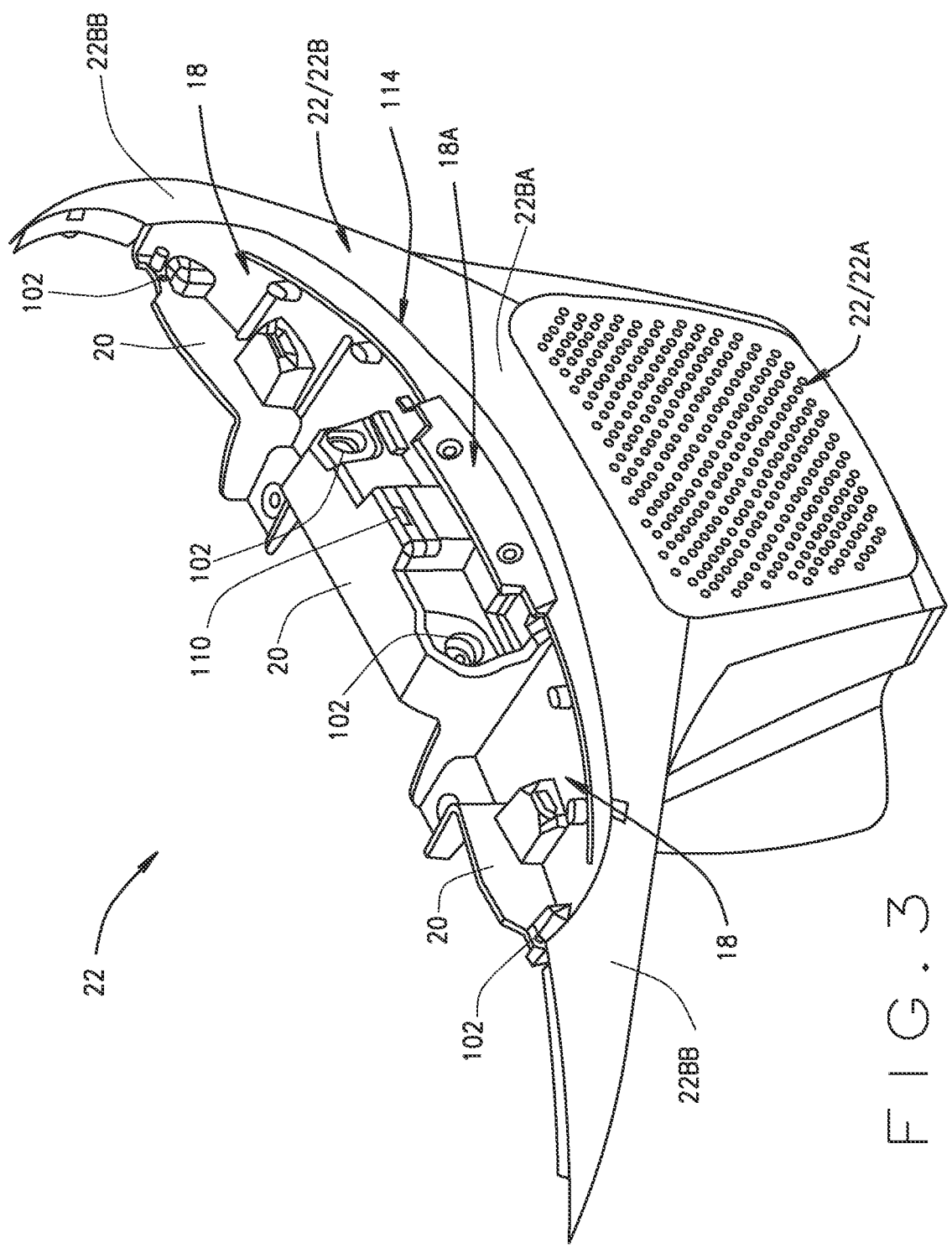
FIG. 3 is an isometric view of a bumper and wheel-well assembly of the front body assembly comprising the utility bay having the headlight pocket(s) and mounting structure integrated therein in accordance with various embodiments of the present disclosure.
Figure 4:
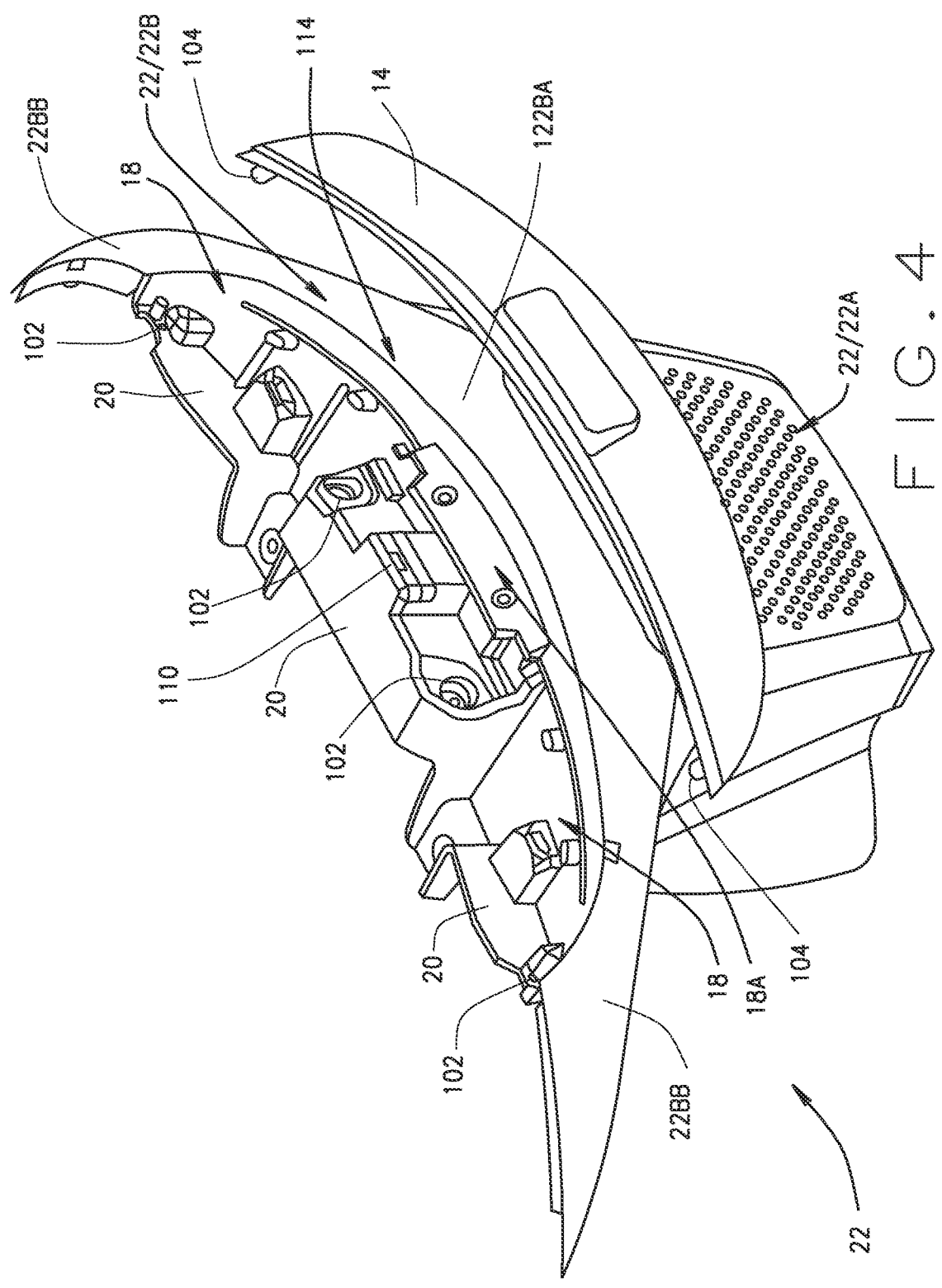
FIG. 4 is an exploded front isometric view of the bumper and wheel-well assembly comprising the utility bay configured with a removeable non-headlight body fascia panel to configure the vehicle as the golf car shown in FIG. 1 in accordance with various embodiments of the present disclosure.
Figure 8:
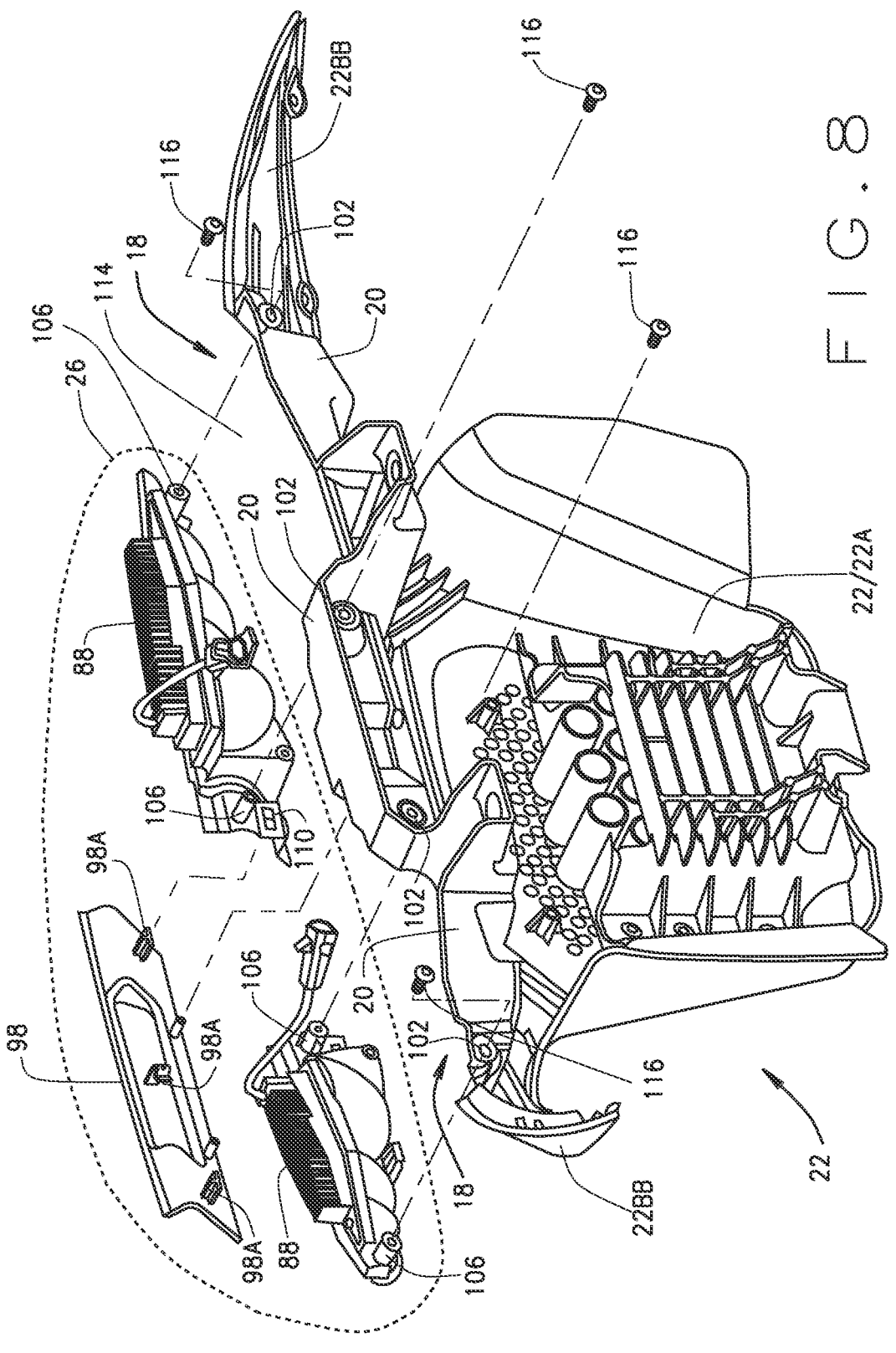
FIG. 8 is an exploded rear isometric view of the bumper and wheel-well assembly shown in FIG. 7 in accordance with various embodiments of the present disclosure.
Figure 9:
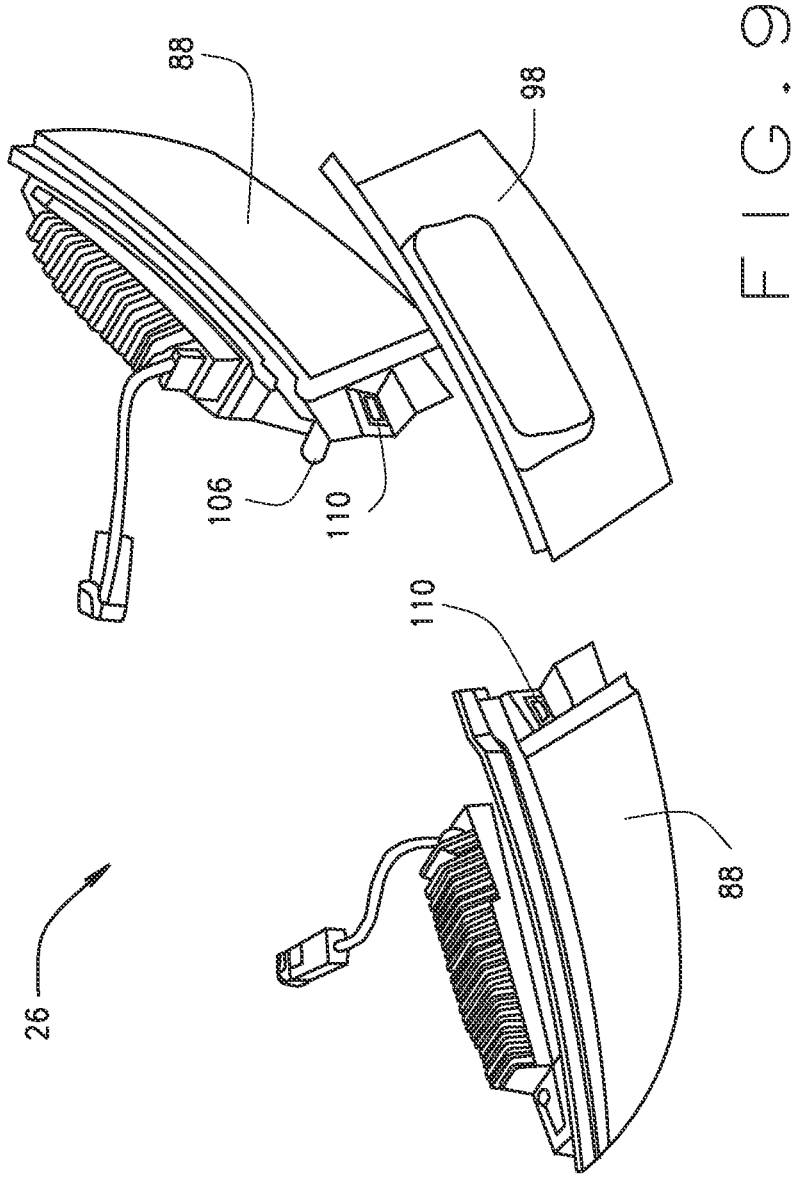
FIG. 9 is a front isometric view of the headlight assembly in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two are more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Figure 10:
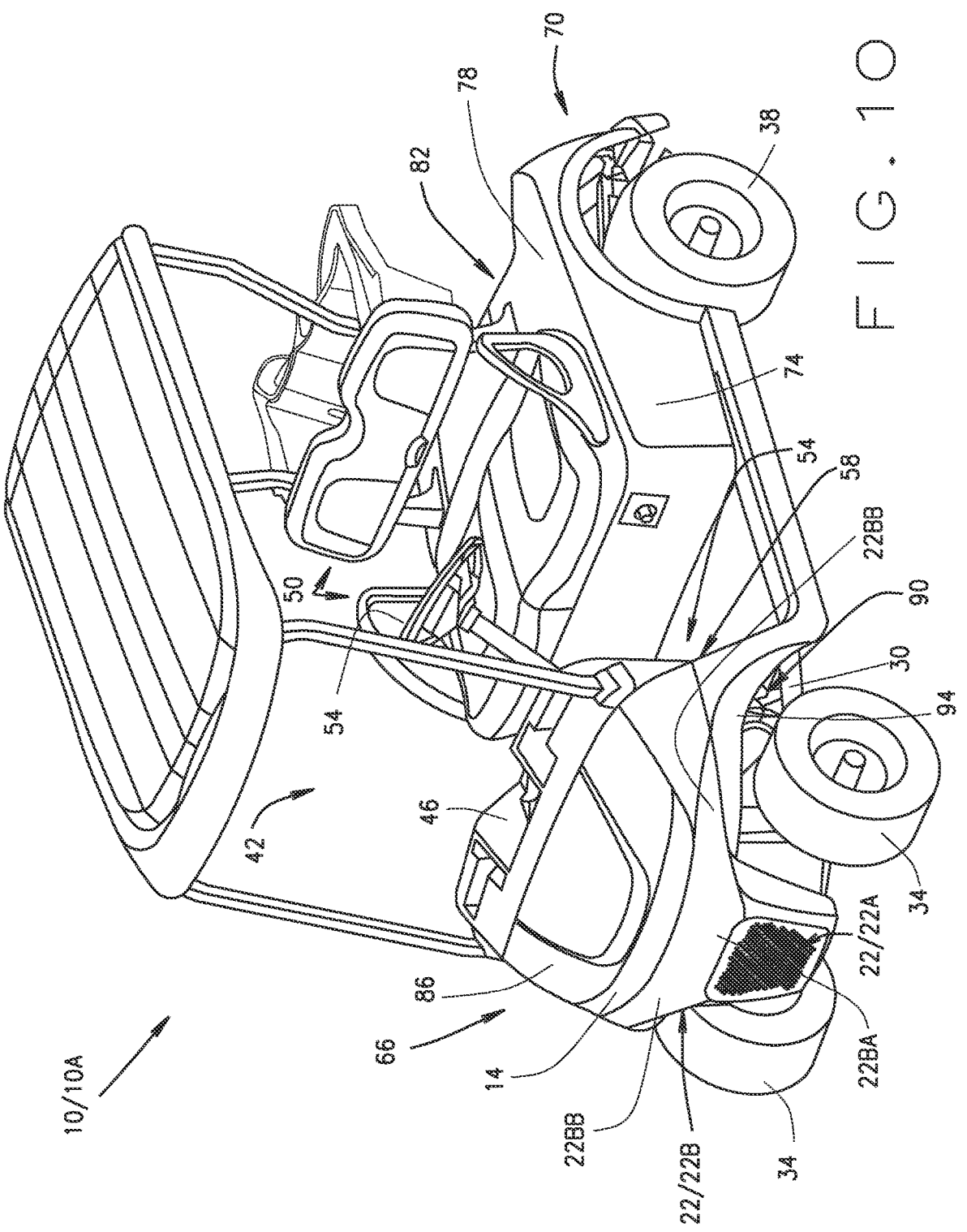
FIG. 10 is an isometric view of a vehicle of the present disclosure comprising the front body assembly that comprises a utility bay including at least one headlight pocket and mounting structure, wherein the vehicle is configured as a golf car in accordance with various alternate embodiments of the present disclosure.
Figures 12, 13:
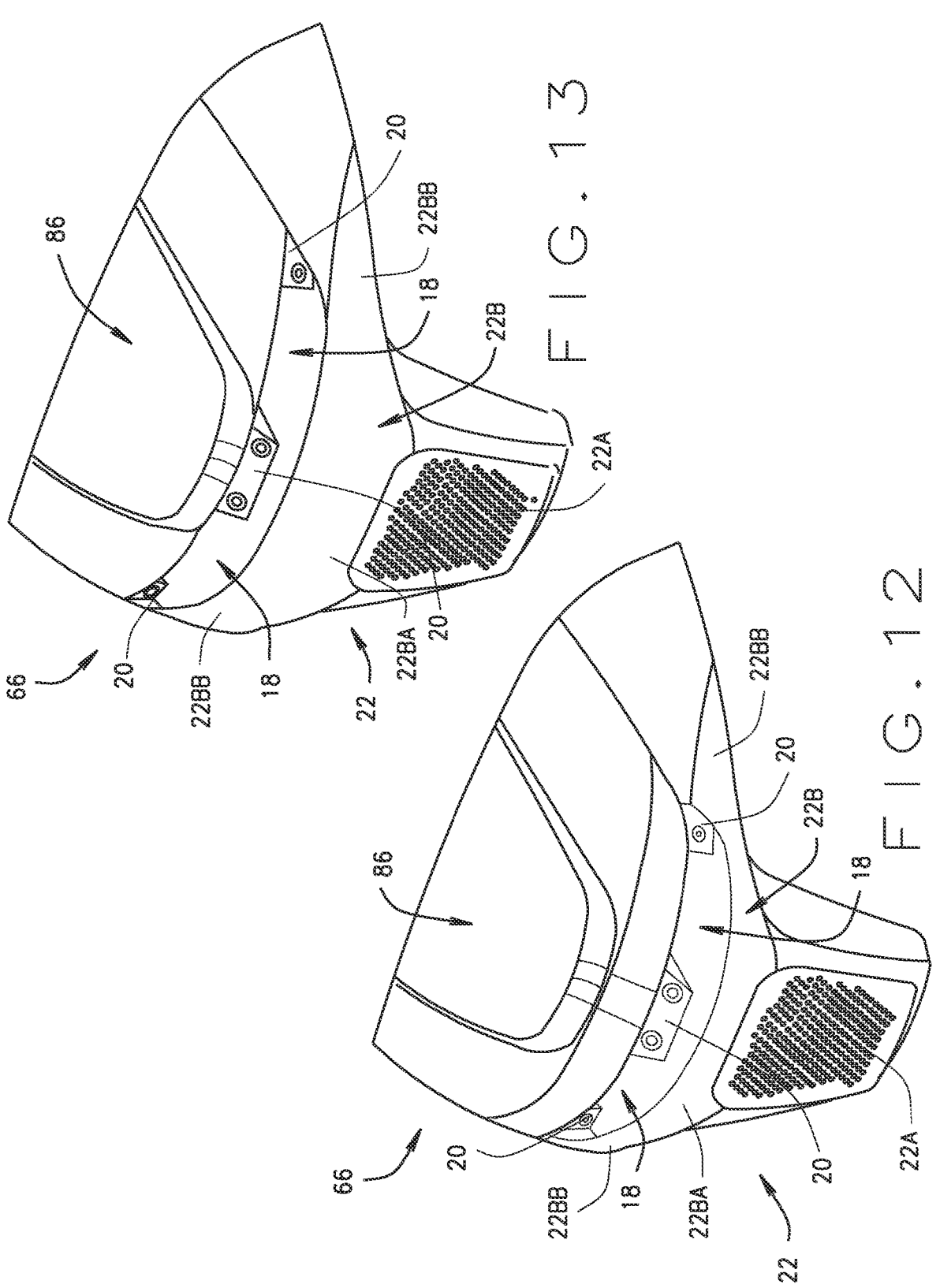
FIG. 12 is an isometric view of the front body assembly having the utility bay integrated into or integrally formed with the bumper and wheel-well assembly in accordance with various embodiments of the present disclosure.
FIG. 13 is an isometric view of the front body assembly having the utility bay integrated into or integrally formed with a front cowl assembly of the front body assembly in accordance with various embodiments of the present disclosure.
Figure 14:
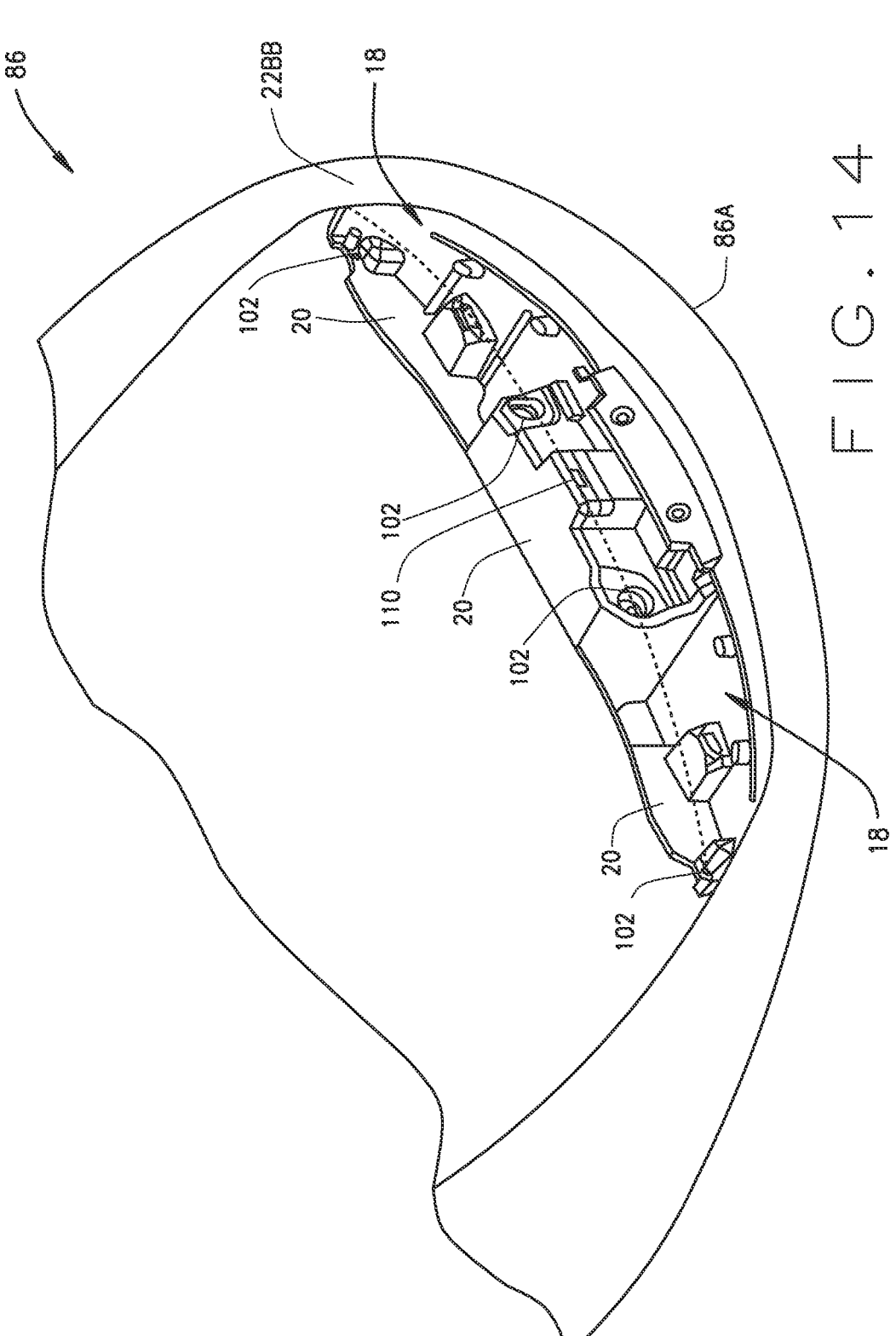
FIG. 14 is an isometric view of the cowl comprising the utility bay having the headlight pocket(s) and mounting structure integrated therein in accordance with various embodiments of the present disclosure.
Figure 15:
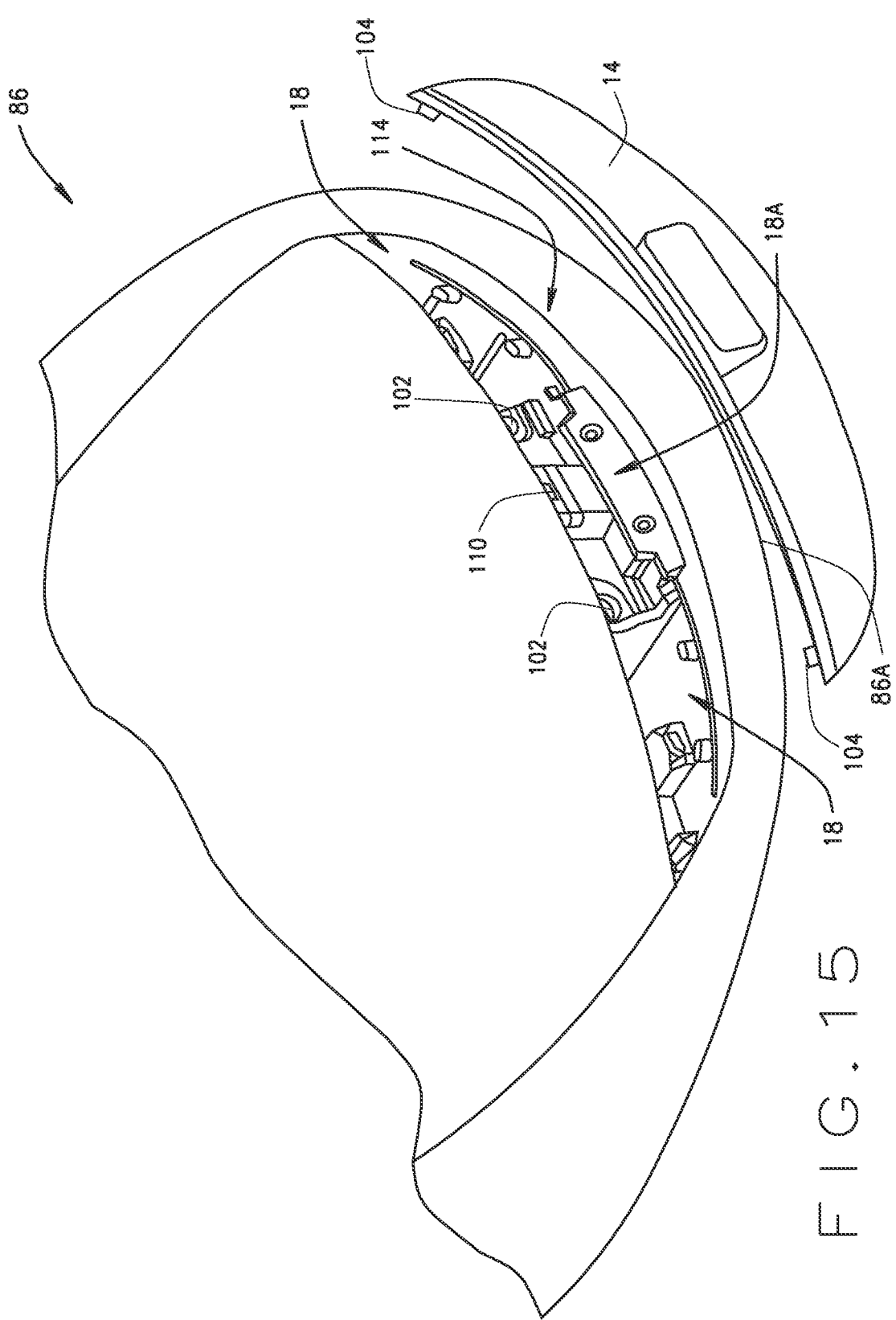
FIG. 15 is an exploded front isometric view of the cowl comprising the utility bay configured with a removeable non-headlight body fascia panel to configure the vehicle as the golf car shown in FIG. 10 in accordance with various embodiments of the present disclosure.
Figure 16:
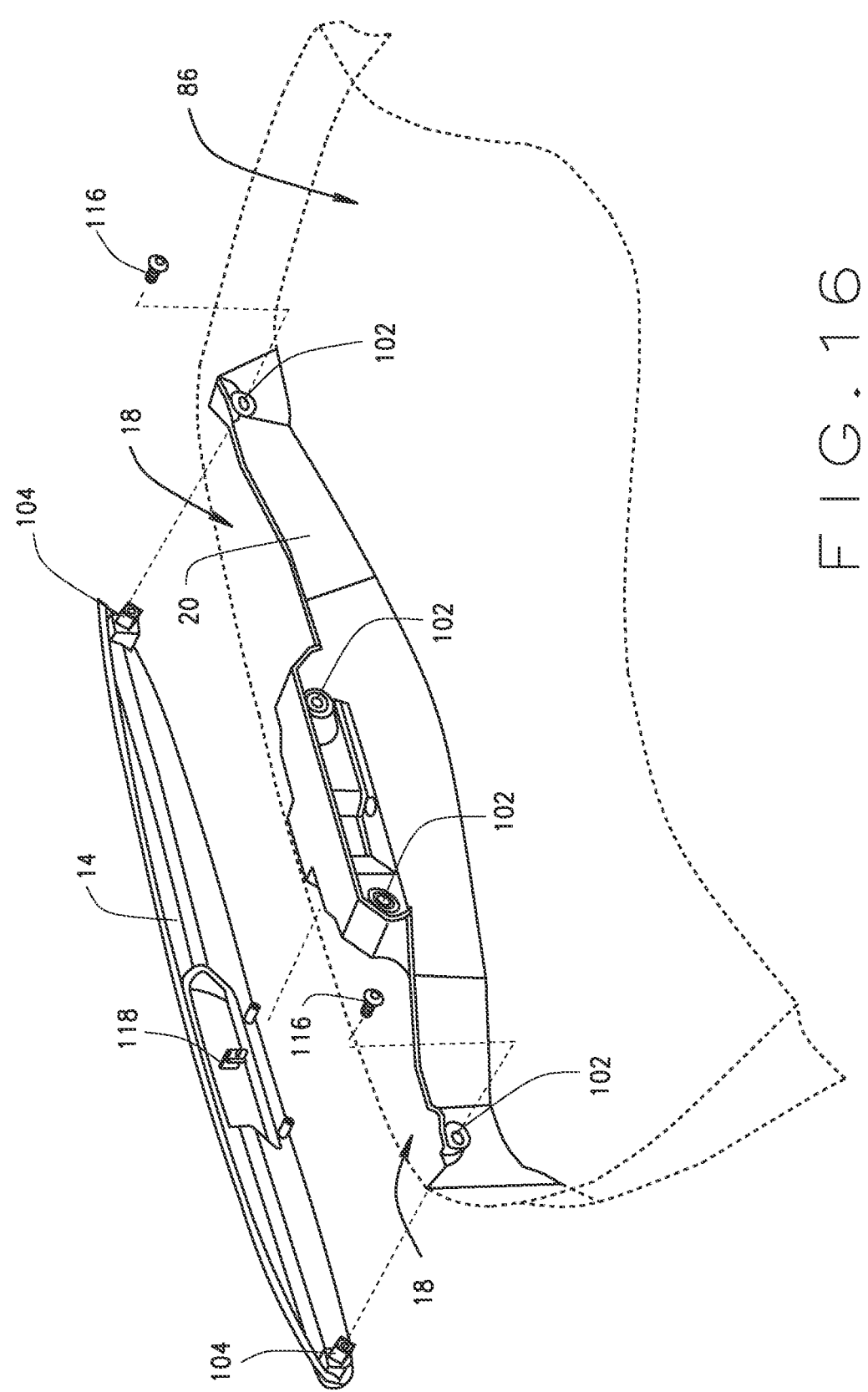
FIG. 16 is an exploded rear isometric view of the bumper and wheel-well assembly shown in FIG. 15 in accordance with various embodiments of the present disclosure.
Figure 17:
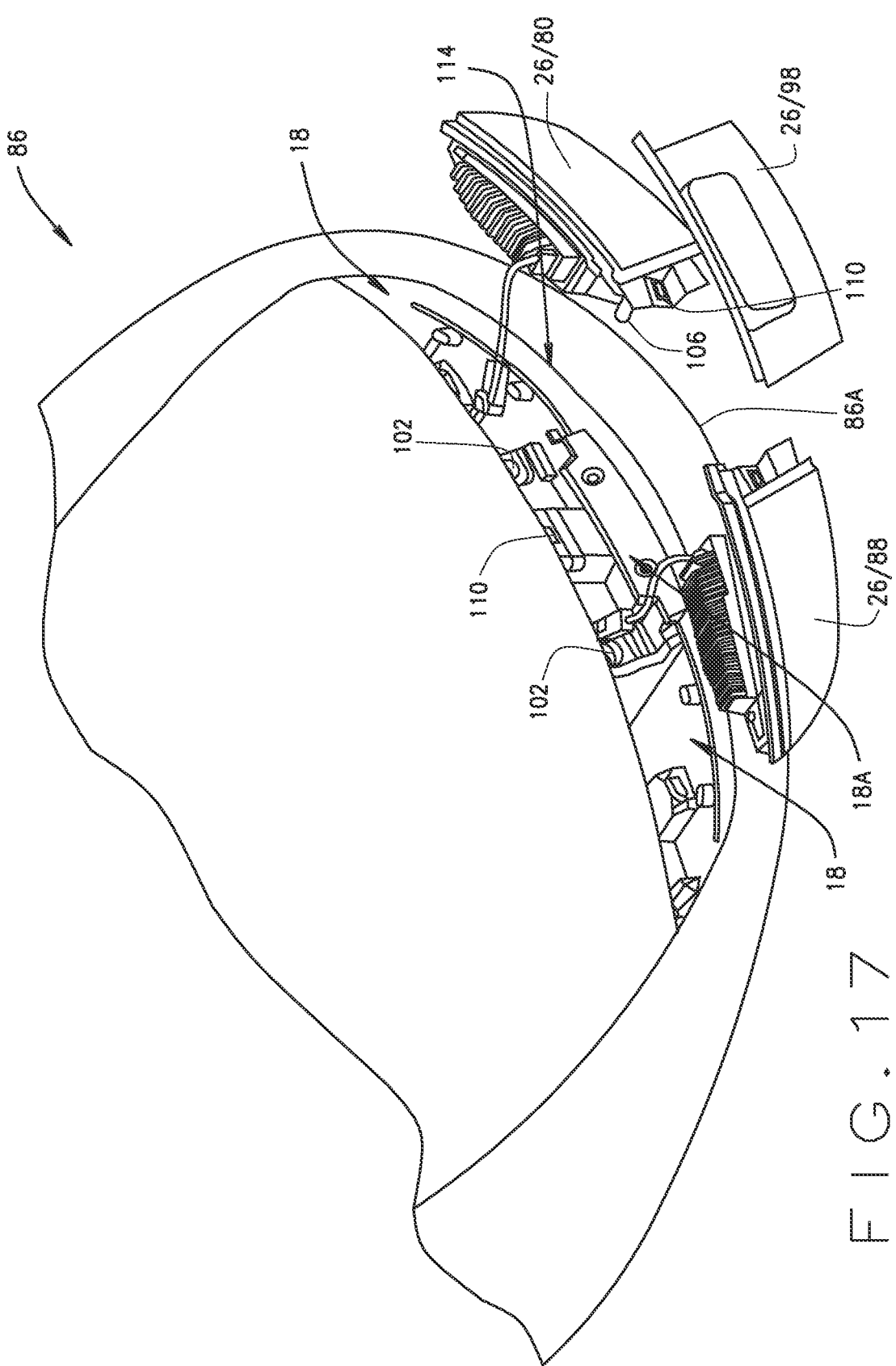
FIG. 17 is an exploded front isometric view of the cowl comprising the utility bay configured with a headlight assembly to configure the vehicle as the personal consumer vehicle shown in FIG. 11 in accordance with various embodiments of the present disclosure.
Figure 18:
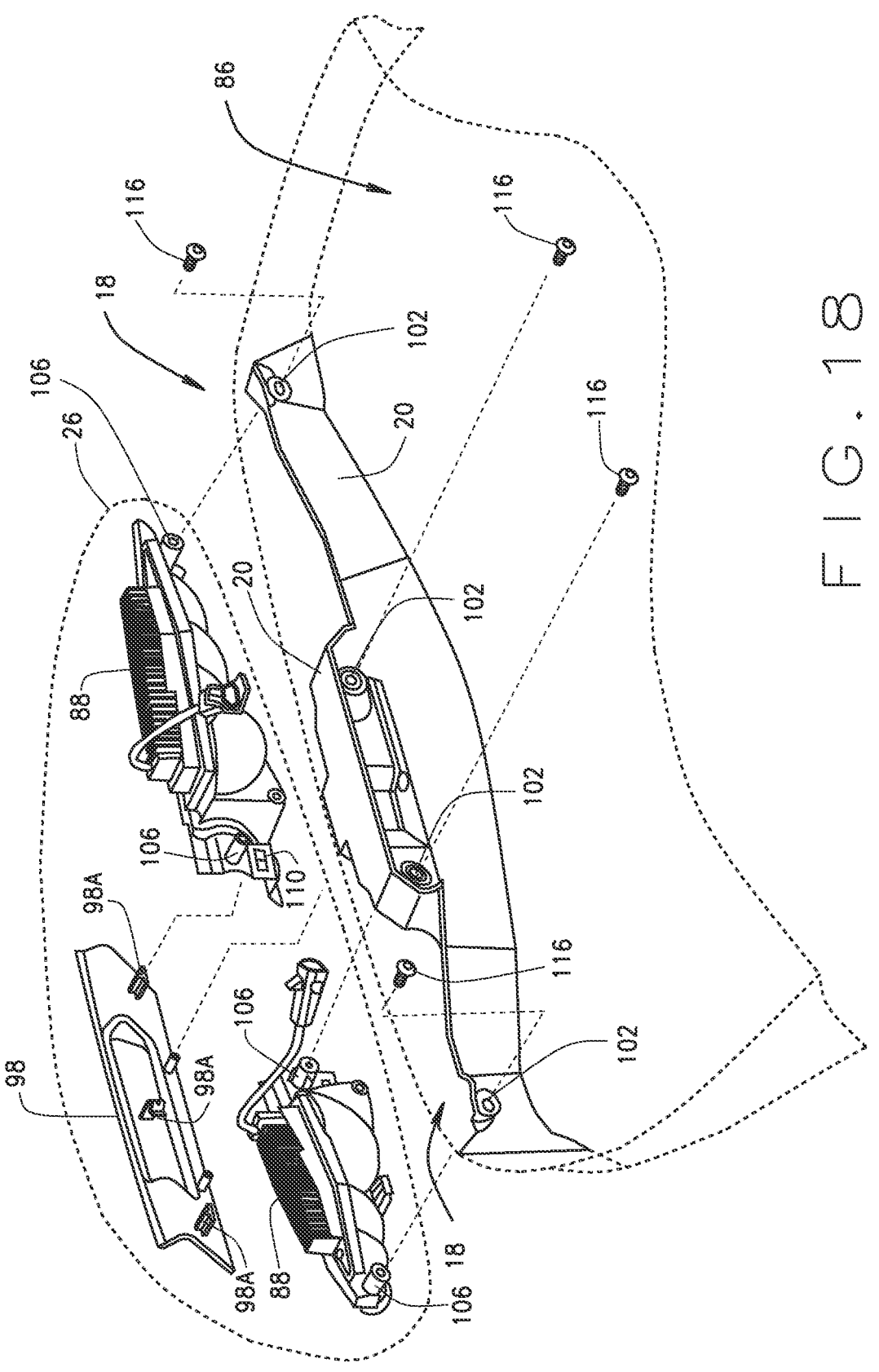
FIG. 18 is an exploded rear isometric view of the bumper and wheel-well assembly shown in FIG. 17 in accordance with various embodiments of the present disclosure.

Referring to FIGS. 1, 2, 10, 11, 12 and 13, in various embodiments, the present disclosure generally provides a vehicle 10 that is designed, constructed, manufactured and assembled to have an initially configuration as a golf car 10A not having headlights (as shown in FIGS. 1 and 10), but can be easily and quickly converted or reconfigured to a personal consumer vehicle 10B configuration (as shown in FIGS. 2 and 11) having headlights. Particularly, the vehicle 10 can be converted or reconfigured from the golf car 10A absent headlights to the personal consumer vehicle 10B having headlights without the need to physically alter the vehicle 10 body or add additional headlight mounting structure and/or brackets that are not included as part of the vehicle 10. As used herein, the term 'physically alter' will be understood to mean to physically alter or change the structural character and/or physical size, shape and/or geometry of a vehicle 10 structure, frame, component or body part by drilling one or more hole in the body part, or cutting, sawing, bending or otherwise reshaping the structural character and/or physical size, shape and/or geometry of any part of any vehicle 10 structure, frame, component or body part.

The vehicle 10 generally comprises a front body assembly 66 and a rear body assembly 70. In various embodiments, the rear body assembly 70 is formed to comprise a seat pedestal portion 74, rear deck portion 78 and a golf bag well 82. In various embodiments, the front body assembly 66 comprises the bumper and wheel-well assembly 22 that is mounted to a chassis 30 and a front cowl 86 that is mounted to the bumper and wheel-well assembly 22 and/or the chassis 30. The front body assembly 66 additionally comprises a utility bay 114 structured and operable to interchangeably receive one or more removable non-headlight body fascia panel 14 (referred to herein simply as the fascia panel 14) when the vehicle 10 is configured as the golf car 10A and one or more headlight assembly 26 (referred to herein simply as the headlight assembly 26) when the vehicle 10 is configured as the personal consumer vehicle 10B. As described further below, in various embodiments, the utility bay 114 can be integrated into or integrally formed with the bumper and wheel-well assembly 22, while in other embodiments, the utility bay 114 can be integrated into or integrally formed with the front cowl 86. The utility bay 114 comprises one or more headlight pocket 18 one or more mounting structure 20 to which the fascia panel 14 and headlight assembly 26 are interchangeably mounted, as described below.

The vehicle 10 further generally comprises pair of front wheels 34 and a pair of front wheels 38 operationally connected to the chassis 30, and a passenger compartment 42. The passenger compartment 42 generally includes an instrument panel or dash console 46, a passenger seating structure 50, a steering wheel 54 for use by the passenger/user to control the directional movement of the vehicle 10, a brake pedal 58 for use by the passenger/user to control slowing and stopping of the vehicle 10, and an accelerator pedal 62 for use by the operator to control the torque delivered by a prime mover (not shown) to one or more of the front and/or rear wheels 34 and/or 35. The prime mover can be any device that is structured and operable to generate torque (e.g., motive force, e.g., power) utilized to provide motive force for the vehicle 10. For example, in various embodiments, the prime mover can be an internal combustion engine (ICE), an electric motor, a hybrid combination of an ICE and an electric motor, or any other suitable motive power source.

In various embodiments, the vehicle 10 is initially configured as the golf car 10A comprising the fascia panel 14 that is mounted within a front or face portion of the utility bay 114 such that the fascia panel 14 covers and conceals the utility bay 14 and the headlight pocket(s) 18. Particularly, the fascia panel 14 is mounted to the mounting structure 20 (best shown in FIGS. 3, 4, 5, 7, 8, 14, 15, 16, 17 and 18) disposed within the utility bay 114 and integrated into and/or integrally formed with one of the front cowl 86 or the bumper and wheel-well assembly 22 of the vehicle 10. As described herein, upon conversion from the golf car 10A configuration to the personal consumer vehicle 10B configuration the fascia panel(s) 14 can be simply and easily removed and replaced (i.e., interchanged) with the headlight assembly 26 that is/are structured and manufactured to fit within utility bay 114 and furthermore within the headlight pocket(s) 18 and to be mounted to the mounting structure 20.

Hence, the vehicle 10 is designed, constructed, manufactured and assembled such that the front body assembly 66, chassis 30 and other structure include all necessary openings, cavities, pockets, features, structure, supports, brackets, etc., needed to mount and retain the removeable fascia panel 14 for configuration as the golf car 10A and to interchangeably mount and retain the headlight assembly 26 for configuration as the personal consumer vehicle 10B, without physical alteration of any structure, part, assembly or component of the vehicle 10, such as cutting and/or drilling holes in the front body assembly 66, and without the need to add additional headlight mounting structure or brackets to the vehicle 10. Particularly, the removable fascia panel 14 can be mounted to the same mounting structure 20 to which the headlight assembly 26 is mounted.

Although it is envisioned that the facia panel(s) 14 can include multiple pieces or components, for simplicity the exemplary embodiments illustrated and described herein will refer to a single piece facia panel 14 and be simply referred to herein as the facia panel 14. Additionally, although it is envisioned that the headlight assembly(ies) 26 can comprise a plurality of headlight assemblies, for simplicity the exemplary embodiments illustrated and described herein will refer to a single headlight assembly 26 and be simply referred to herein as the headlight assembly 26. It is envisioned that the headlight assembly 26 can include one or more headlight 88, however the headlight assembly 26 will be exemplarily illustrated and described herein to comprise a pair of headlights 88. Correspondingly, although the bumper and wheel-well assembly 22 can include one or more headlight pocket 18, for simplicity the exemplary embodiments illustrated and described herein will refer to a pair the headlight pockets 18 and will be simply referred to herein as the headlight pockets 18.

Referring now to FIGS. 1, 2, 3, 4, 5, 6, 7, 8, 9 and 12, as described above, in various embodiments, the utility pocket 114 can be formed within the bumper and wheel-well assembly 22. In such embodiments, the bumper and wheel-well assembly 22 comprises the utility bay 114 having formed and disposed therein the headlight pockets 18 and the mounting structure 20. As also described above, in various embodiments, the mounting structure 20 is structured and operable to have the fascia panel 14 mounted thereto when the vehicle 10 is configured as the golf car 10A, and to have the headlight assembly 26 mounted thereto when the vehicle 10 is configured as the personal consumer vehicle 10B. The bumper and wheel-well assembly 22 includes a bumper portion 22A and a utility bay and wheel-well portion 22B formed and disposed above the bumper portion 22A between the bumper portion 22A and the front cowl 86. The bumper portion 22A is formed to extend longitudinally forward (relative to the length of the vehicle 10) beyond the utility bay and wheel-well portion 22B such that when the vehicle 10 is moving in a forward direction, the bumper portion will impact or contact an object in front of the vehicle 10 before the utility bay and wheel-well portion 22B. More particularly, in various embodiments, the bumper portion 22A is structured to prevent impact or contact of the utility bay and wheel-well portion 22B with an object in front of the vehicle 10 at low vehicle speeds. The utility bay and wheel-well portion 22B comprises a center section 22BA that is disposed above a top of the bumper portion 22A and a pair of wheel-well wings 22BB that extend laterally outward from the center section 22BA and wrap around the sides of the vehicle 10 to form an upper portion of wheel-wells 90. In various embodiments, the center section 22BA extends at an angle rearwardly from the top of the bumper portion 22A. In various embodiments, wheel-well flares 94 can be mounted to (at least partially mounted to) the wheel-well wings 22BB.

Referring now to FIGS. 1, 3, 4, 5, 6 and 12, as described above, the headlight pocket(s) 18 and the mounting structure 20 are integrated into and/or integrally formed within the utility bay 114, which in various embodiments is formed within the bumper and wheel-well assembly 22. More particularly, in such embodiments the headlight pockets 18 and the mounting structure 20 are integrated into and/or integrally formed within the utility bay 114 disposed and integrally formed within the bumper and wheel-well assembly utility bay and wheel-well portion 22B above the utility and wheel-well portion center section 22BA between the wheel-well wings 22BB. In various embodiments, the utility bay 114 comprises the headlight pockets 18 and a recess 18A formed between headlight pockets 18. The mounting structure 20, at least in part, forms a rear wall of the headlight pockets 18. The mounting structure 20 comprises a plurality of boss receptors 102 to which, as described below, the facia panel 14 can be secured when the vehicle 10 is configured as the golf car 10A, and the headlight assembly 26 (e.g., the headlights 88) can be secured when the vehicle 10 is configured as the personal consumer vehicle 10B. Hence, the boss receptors 102 are structured and operable to interchangeably secure the facia panel 14 to the bumper and wheel-well assembly utility bay and wheel-well portion 22B when the vehicle 10 is configured as the golf car 10A, and the headlights 88 to the bumper and wheel-well assembly utility bay and wheel-well portion 22B when the vehicle 10 is configured as the personal consumer vehicle 10B.

For example, when the vehicle 10 is configured as a golf car 10A, the boss receptors 102 are structured and operable to receive distal ends of one or more fascia panel mounting boss 104 formed on and extending from a backside of the fascia panel 14. In such embodiments, the fascia panel 14 is mounted to the bumper and wheel-well assembly utility bay and wheel-well portion 22B within the utility bay 114. More specifically, the facia panel 14 is mounted to the center section 22BA of the utility and wheel-well portion of the bumper and wheel-well assembly 22B by disposing the fascia panel 14 within the utility bay 114 such that the distal ends of the fascia panel mounting bosses 104 are in contact with and/or disposed within the corresponding boss receptors 102. Thereafter the fascia panel mounting bosses 104 are secured to the corresponding boss receptors 102, and hence secured to the bumper and wheel-well assembly utility bay and wheel-well portion 22B using any suitable fastener devices 116 such as screws, snaps, retainer clips, etc., thereby securing the fascial panel 14 within the utility bay 114 of the bumper and wheel-well assembly utility bay and wheel-well portion 22B.

In various embodiments, the fascia panel 14 can include one or more retainer clips 118 disposed on and extending from a back side of the fascia panel 14 that is/are removably mateable with clip receivers 110 formed in the mounting structure 20. The facia panel retainer clip(s) 118 is/are structured and operable to additionally secure the facial panel 14 within the utility bay 114 of the bumper and wheel-well assembly utility bay and wheel-well portion 22B. As one skilled in the art will readily understand, the fascial panel 14 can be easily removed from bumper and wheel-well assembly utility bay and wheel-well portion 22B by removing the fastener devices 116 from the fascia panel mounting bosses 104, thereby disconnecting the fascia panel mounting bosses 104 from the mounting structure boss receptors 102. In various embodiments, access to the bumper and wheel-well assembly utility bay and wheel-well portion 22B to secure and remove the fascia panel 14 to and from the bumper and wheel-well assembly utility bay and wheel-well portion 22B can be provided through the wheel-wells 90 of the vehicle 10, while in other embodiments, access can be provided by removing at least a portion of the dash console 46.

Referring now to FIGS. 2, 3, 7, 8, 9 and 12, as described above, in various embodiments, the vehicle front body assembly 66 comprises the bumper and wheel-well assembly 22, which comprises the utility bay and wheel-well portion 22B, which comprises the utility bay 114, which includes the headlight pocket(s) 18 and the mounting structure 20 that are integrated into and/or integrally formed therewith. As also described above, the mounting structure 20 comprises a plurality of boss receptors 102 to which the facia panel 14 can be secured when the vehicle 10 is configured as the golf car 10A, and to which the headlights 88 can be secured when the vehicle 10 is configured as the personal consumer vehicle 10B. For example, when the vehicle 10 is configured as a personal consumer vehicle 10B the boss receptors 102 are structured and operable to receive distal ends of one or more headlight mounting boss 106 formed on and extending from a backside of each headlight 88. In such embodiments, the headlights 88 are mounted to the bumper and wheel-well assembly utility bay and wheel-well portion 22B within the utility window 114, and more specifically within the headlight pockets 18. The headlight pockets 18 are recessed within the utility bay 114 and formed to complement and correspond to the size and shape of the headlights 88 such that a body of the headlights 88 will fit within the headlight pockets 18 and a front face or lens of the headlights 88 will be approximately flush with the outer surface of the bumper and wheel-well assembly utility bay and wheel-well portion 22B. Each headlight 88 is mounted within the headlight pocket 18 by inserting the body of the headlight 88 within the respective headlight pocket 18 such that the distal ends of the headlight mounting bosses 106 are in contact with and/or disposed within the corresponding boss receptors 102. Thereafter the headlight mounting bosses 106 are secured to the corresponding boss receptors 102, and hence secured to the bumper and wheel-well assembly utility bay and wheel-well portion 22B using any suitable fastener device such as screws, snaps, retainer clips, etc., thereby securing the headlights 88 to the bumper and wheel-well assembly utility bay and wheel-well portion 22B within the utility bay 114.

In various embodiments, in addition to the headlights 88, the headlight assembly 26 comprises a bridge plate 98 that is disposable between the headlights 88 when the headlights 88 are mounted to the mounting structure 20. The bridge plate 98 is connectable to the headlights 88 and/or the mounting structure 20. The bridge plate 98 can comprise any structure that is structured and operable to bridge and cover a gap or space between the headlights 88 when the headlights 88 are disposed within the headlight pockets 18 and mounted to the mounting structure 20, e.g., a decorative plate, a logo plate, a license plate holder, decorative LED light structure, etc. Once the headlights 88 are mounted to the mounting structure 20 within the headlight pockets 18 the bridge plate 98 can be mounted between the headlights 88 to span the gap or space therebetween and cover the recess 18A. The bridge plate 98 can be mounted to the headlights 88 only, or to the mounting structure 20 only, or to both the headlights 88 and the mounting structure 20 using the fastener devices 116, e.g., screws, snaps, retainer clips, etc. For example, in various embodiments, the bridge plate 98 can be mounted to the headlights 88 and the mounting structure 20 via retainer clips 98A disposed on a back side of the bridge plate 98 that removably mate with clip receivers 110 formed in the headlights 88 and the mounting structure 20.

As one skilled in the art will readily understand, the headlights 88 can be easily removed from the bumper and wheel-well assembly utility bay and wheel-well portion 22B by removing the fastener devices 116 from the headlight mounting bosses 102 thereby disconnecting the headlight mounting bosses 102 from the mounting structure boss receptors 102. In various embodiments, access to the bumper and wheel-well assembly utility bay and wheel-well portion 22B to secure and remove the headlights 88 to and from the bumper and wheel-well assembly utility bay and wheel-well portion 22B via the mounting bosses 102, boss receptors 102 and fastener devices 116 can be provided through the wheel-wells of the vehicle 10, while in other embodiments, access can be provided by removing at least a portion of the dash console 46.

Referring now to FIGS. 6, 9, 10, 11, 13, 14, 15, 16, 17 and 18 as described above, in various embodiments, the utility pocket 114 can be formed within cowl 86 of the front body assembly 66. In such embodiments, the front cowl 86 comprises the utility bay 114 having formed and disposed therein the headlight pockets 18 and the mounting structure 20. As also described above, in various embodiments, the mounting structure 20 is structured and operable to have the fascia panel 14 mounted thereto when the vehicle 10 is configured as the golf car 10A, and to have the headlight assembly 26 mounted thereto when the vehicle 10 is configured as the personal consumer vehicle 10B. The utility bay 114 can be formed at any desired location within the front cowl 86. For example, in various embodiments the utility bay 114 is integrally formed within a front portion of the front cowl 86 at or near a forward edges 86A of the front cowl 86, wherein the front of the front portion of the cowl 89 extends at an angle rearwardly from the center section 22BA of the utility bay and wheel-well portion 22B of the bumper and wheel-well assembly 22, which extends at an angle rearwardly from the top of the bumper portion 22A of the bumper and wheel-well assembly 22.

Referring now to FIGS. 6, 10, 13, 14, 15, 16, as described above, the headlight pocket(s) 18 and the mounting structure 20 are integrated into and/or integrally formed within the utility bay 114, which in various embodiments is formed within the front cowl 86. As described above, in various embodiments, the utility bay 114 comprises the headlight pockets 18 and the recess 18A formed between headlight pockets 18, and the mounting structure 20, at least in part, forms a rear wall of the headlight pockets 18. The mounting structure 20 comprises a plurality of boss receptors 102 to which, as described below, the facia panel 14 can be secured when the vehicle 10 is configured as the golf car 10A, and the headlight assembly 26 (e.g., the headlights 88) can be secured when the vehicle 10 is configured as the personal consumer vehicle 10B. Hence, the boss receptors 102 are structured and operable to interchangeably secure the facia panel 14 to the front cowl 89 when the vehicle 10 is configured as the golf car 10A, and the headlights 88 to the front cowl 86 when the vehicle 10 is configured as the personal consumer vehicle 10B.

For example, when the vehicle 10 is configured as a golf car 10A, the boss receptors 102 are structured and operable to receive distal ends of one or more of the fascia panel mounting bosses 104 formed on and extending from a backside of the fascia panel 14. In such embodiments, the fascia panel 14 is mounted to the front cowl within the utility bay 114. More specifically, the facia panel 14 is mounted to the front cowl 86 by disposing the fascia panel 14 within the utility bay 114 such that the distal ends of the fascia panel mounting bosses 104 are in contact with and/or disposed within the corresponding boss receptors 102. Thereafter the fascia panel mounting bosses 104 are secured to the corresponding boss receptors 102, and hence secured to the front cowl 86 using any suitable fastener devices 116 such as screws, snaps, retainer clips, etc., thereby securing the fascial panel 14 within the utility bay 114 of the front cowl 86.

As described above, in various embodiments, the fascia panel 14 can include one or more retainer clips 118 disposed on and extending from a back side of the fascia panel 14 that is/are removably mateable with clip receivers 110 formed in the mounting structure 20. The facia panel retainer clip(s) 118 is/are structured and operable to additionally secure the facial panel 14 within the utility bay 114 of the front cowl 86. As one skilled in the art will readily understand, the fascial panel 14 can be easily removed from the front cowl 86 by removing the fastener devices 116 from the fascia panel mounting bosses 104, thereby disconnecting the fascia panel mounting bosses 104 from the mounting structure boss receptors 102. In various embodiments, access to the front cowl 86 to secure and remove the fascia panel 14 to and from the front cowl 86 can be provided through the wheel-wells 90 of the vehicle 10, while in other embodiments, access can be provided by removing at least a portion of the dash console 46.

Referring now to FIGS. 11, 13, 14, 17 and 18, as described above, in various embodiments, the vehicle front body assembly 66 comprises the front cowl 86, which comprises the utility bay 114, which includes the headlight pocket(s) 18 and the mounting structure 20 that are integrated into and/or integrally formed therewith. As also described above, the mounting structure 20 comprises a plurality of boss receptors 102 to which the facia panel 14 can be secured when the vehicle 10 is configured as the golf car 10A, and to which the headlights 88 can be secured when the vehicle 10 is configured as the personal consumer vehicle 10B. For example, when the vehicle 10 is configured as a personal consumer vehicle 10B the boss receptors 102 are structured and operable to receive distal ends of one or more headlight mounting boss 106 formed on and extending from a back-side of each headlight 88. In such embodiments, the head-lights 88 are mounted to the front cowl 86 within the utility window 114, and more specifically within the headlight pockets 18. The headlight pockets 18 are recessed within the utility bay 114 and formed to complement and correspond to the size and shape of the headlights 88 such that a body of the headlights 88 will fit within the headlight pockets 18 and a front face or lens of the headlights 88 will be approxi-mately flush with the outer surface of the front portion of the front cowl 86. Each headlight 88 is mounted within the headlight pocket 18 by inserting the body of the headlight 88 within the respective headlight pocket 18 such that the distal ends of the headlight mounting bosses 106 are in contact with and/or disposed within the corresponding boss recep-tors 102. Thereafter the headlight mounting bosses 106 are secured to the corresponding boss receptors 102, and hence secured to the front cowl 86 using any suitable fastener device such as screws, snaps, retainer clips, etc., thereby securing the headlights 88 to the front cowl 86 within the utility bay 114.

As described above, in various embodiments, in addition to the headlights 88, the headlight assembly 26 comprises the bridge plate 98 that is disposable between the headlights 88 when the headlights 88 are mounted to the mounting structure 20. The bridge plate 98 is connectable to the headlights 88 and/or the mounting structure 20. The bridge plate 98 can comprise any structure that is structured and operable to bridge and cover a gap or space between the headlights 88 when the headlights 88 are disposed within the headlight pockets 18 and mounted to the mounting structure 20, e.g., a decorative plate, a logo plate, a license plate holder, decorative LED light structure, etc. Once the head-lights 88 are mounted to the mounting structure 20 within the headlight pockets 18 the bridge plate 98 can be mounted between the headlights 88 to span the gap or space therebe-tween and cover the recess 18A. The bridge plate 98 can be mounted to the headlights 88 only, or to the mounting structure 20 only, or to both the headlights 88 and the mounting structure 20 using the fastener devices 116, e.g., screws, snaps, retainer clips, etc. For example, in various embodiments, the bridge plate 98 can be mounted to the headlights 88 and the mounting structure 20 via retainer clips 98A disposed on a back side of the bridge plate 98 that removably mate with clip receivers 110 formed in the headlights 88 and the mounting structure 20.

As one skilled in the art will readily understand, the headlights 88 can be easily removed from front cowl 86 by removing the fastener devices 116 from the headlight mounting bosses 102 thereby disconnecting the headlight mounting bosses 102 from the mounting structure boss receptors 102. In various embodiments, access to the front cowl 86 to secure and remove the headlights 88 to and from the front cowl 86 via the mounting bosses 102, boss recep-tors 102 and fastener devices 116 can be provided through the wheel-wells of the vehicle 10, while in other embodi-ments, access can be provided by removing at least a portion of the dash console 46.

As described above, the vehicle 10 can be easily and quickly converted or reconfigured from the golf car 10A (a shown in FIGS. 1 and 10) configuration wherein the vehicle 10 comprises the fascia panel 14 and is absent the headlights 88 (a shown in FIGS. 1 and 10) to a personal consumer vehicle 10B configuration wherein the vehicle 10 comprises the headlights 88 and is the absent fascia panel 14 (as shown in FIGS. 2 and 11) without the need to physically alter the vehicle 10 body or add additional headlight mounting struc-ture and/or brackets that are not included as part of the vehicle 10. More specifically, the utility bay 114 of the vehicle 10 is structured such that the fascia panel 14 and the headlights 88 are interchangeably connectable thereto.

It is envisioned that in various embodiments, the present disclosure the vehicle 10 can further comprise a rear fascia panel and taillight mounting structure similar to the mount-ing structure 20 described above, wherein one or more rear fascia panel can be interchangeably mounted to the taillight mounting structure. Particularly, in such instances, the rear fascia panel(s) and can simply be disconnected from the taillight mounting structure and removed then replaced (interchanged) with one or more taillight and/or taillight assembles that is/are designed and manufactured to fit within opening(s) where the rear fascia panel(s) was/were removed and mount to the existing taillight mounting structure to which the fascia panel(s) was/were connected. Hence, in such embodiments, the vehicle 10 is designed, constructed and assembled such that the body and frame include all necessary features needed to mount and retain both the rear fascia panel(s) and the taillights without physical alteration of various parts of the vehicle, such as cutting and/or drilling holes in the body, or the addition of supplementary brackets.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A front body assembly for a vehicle, said front body assembly comprising:
   a bumper and wheel-well assembly;
   a cowl connectable to the front bumper and wheel-well assembly; and
   a utility bay disposed in one of the front bumper and wheel-well assembly and the front cowl, wherein the utility bay comprises:
   one or more headlight pocket; and
   mounting and support structure that is structured and operable to interchangeably secure a fascia panel and a headlight assembly within the utility bay.

2. The front body assembly of claim 1, wherein the utility bay is structured and operable to interchangeably receive:
   the fascia panel, and
   the headlight assembly, the headlight assembly compris-ing one or more headlight.

3. The front body assembly of claim 2, wherein the headlight assembly further comprise a bridge plate that is connectable to at least one of:

the one or more headlight; and the mounting and support structure.

4. The front body assembly of claim 2, wherein the mounting and support structure comprise a plurality of boss receptors structured and operable to interchangeably receive and secure thereto one or more fascia panel mounting boss of the facia panel and one or more headlight mounting boss of the at one or more headlight.

5. The front body assembly of claim 4, wherein the bumper and wheel-well assembly comprises:

a bumper portion; and a utility and wheel-well portion, wherein the utility and wheel-well portion comprises a center section and a pair of wheel-well wings that extend laterally outward from the center section and wrap around sides of the vehicle to form an upper portion of wheel-wells.

6. The front body assembly of claim 5, wherein the center section comprises the utility bay.

7. The front body assembly of claim 6, wherein each wheel-well wing is structured and operable to have a wheel-well flare mounted thereto.

8. A vehicle, said vehicle comprising:

a chassis; and a front body assembly, wherein the front body assembly comprising:

a bumper and wheel-well assembly;

a cowl connected to the front bumper and wheel-well assembly; and a utility bay disposed in one of the front bumper and wheel-well assembly and the front cowl, wherein the utility bay comprises:

one or more headlight pocket; and mounting and support structure that is structured and operable to interchangeably secure a fascia panel and a headlight assembly within the utility bay.

9. The vehicle of claim 8, wherein the utility bay is structured and operable to interchangeably receive:

the fascia panel, and the headlight assembly, the headlight assembly comprising one or more headlight.

10. The vehicle claim 9, wherein the headlight assembly further comprise a bridge plate that is connectable to at least one of:

the one or more headlight; and the mounting and support structure.

11. The vehicle of claim 9, wherein the mounting and support structure comprise a plurality of boss receptors structured and operable to interchangeably receive and secure thereto one or more fascia panel mounting boss of the facia panel and one or more headlight mounting boss of the at one or more headlight.

12. The vehicle of claim 11, wherein the bumper and wheel-well assembly comprises:

a bumper portion; and a utility and wheel-well portion, wherein the utility and wheel-well portion comprises a center section and a pair of wheel-well wings that extend laterally outward from the center section and wrap around sides of the vehicle to form an upper portion of wheel-wells.

13. The vehicle of claim 12, wherein the center section comprises the utility bay.

14. The vehicle of claim 13, wherein each wheel-well wing is structured and operable to have a wheel-well flare mounted thereto.

15. A front body assembly reconfiguration system for reconfiguring a golf car to a personal consumer vehicle, said system comprising:

a fascia panel;

a headlight assembly comprising one or more headlight; and a front body assembly, wherein the front body assembly comprises a bumper and wheel-well assembly;

a cowl connectable to the front bumper and wheel-well assembly; and a utility bay disposed in one of the front bumper and wheel-well assembly and the front cowl, wherein the utility bay comprises:

one or more headlight pocket; and mounting and support structure that is structured and operable to interchangeably secure a fascia panel and a headlight assembly within the utility bay, wherein the utility bay is structured and operable to interchangeably receive the fascia panel and the headlight assembly.

16. The system of claim 15, wherein the headlight assembly further comprise a bridge plate that is connectable to at least one of:

the one or more headlight; and the mounting and support structure.

17. The system of claim 16, wherein the mounting and support structure comprise a plurality of boss receptors structured and operable to interchangeably receive and secure thereto one or more fascia panel mounting boss of the facia panel and one or more headlight mounting boss of the at one or more headlight.

18. The system of claim 17, wherein the bumper and wheel-well assembly comprises:

a bumper portion; and a utility and wheel-well portion, wherein the utility and wheel-well portion comprises a center section and a pair wheel-well wings that extend laterally outward from the center section and wrap around sides of the vehicle to form an upper portion of wheel-wells.

19. The system of claim 18, wherein the center section comprises the utility bay.

20. The system of claim 19, wherein each wheel-well wing is structured and operable to have a wheel-well flare mounted thereto.

* * * * *